US009023207B2

(12) United States Patent
Wang et al.

(10) Patent No.: US 9,023,207 B2
(45) Date of Patent: May 5, 2015

(54) SPIRAL WOUND CARBON MEMBRANE AND PREPARATION METHOD THEREOF

(75) Inventors: Tonghua Wang, Liaoning (CN); Lin Li, Liaoning (CN)

(73) Assignees: Dalian University of Technology, Liaoning (CN); Yingkou Huarui Xiangsheng Chemical Technology Company Ltd., Liaoning (CN)

( * ) Notice: Subject to any disclaimer, the term of this patent is extended or adjusted under 35 U.S.C. 154(b) by 361 days.

(21) Appl. No.: 12/737,391

(22) PCT Filed: Jul. 3, 2009

(86) PCT No.: PCT/CN2009/000757
§ 371 (c)(1),
(2), (4) Date: Mar. 21, 2011

(87) PCT Pub. No.: WO2010/003311
PCT Pub. Date: Jan. 14, 2010

(65) Prior Publication Data
US 2011/0168624 A1    Jul. 14, 2011

(30) Foreign Application Priority Data

Jul. 8, 2008  (CN) .......................... 2008 1 0012222

(51) Int. Cl.
| | |
|---|---|
| B01D 63/10 | (2006.01) |
| B01D 67/00 | (2006.01) |
| B01D 69/14 | (2006.01) |
| B01D 69/12 | (2006.01) |
| B01D 53/22 | (2006.01) |
| B01D 71/02 | (2006.01) |

(52) U.S. Cl.
CPC .............. *B01D 71/021* (2013.01); *B01D 63/10* (2013.01); *B01D 67/0067* (2013.01); *B01D 67/0079* (2013.01); *B01D 69/141* (2013.01); *B01D 2323/08* (2013.01); *B01D 2325/12* (2013.01); *B01D 2325/24* (2013.01); *B01D 2323/21* (2013.01)

(58) Field of Classification Search
CPC ..................... B01D 69/141; B01D 2239/0407; B01D 2239/0654; B01D 2239/0695; B01D 39/086; B01D 69/10; B01D 2323/08; B01D 2325/12; B01D 2325/24; B01D 63/10; B01D 67/0067; B01D 67/0079; B01D 71/021; B01D 2323/21
USPC .............. 210/321.74, 321.83, 483, 488, 489, 210/490, 497.1, 500.27, 500.36, 500.42, 210/500.43, 501, 502.1; 96/11, 12
See application file for complete search history.

(56) References Cited

U.S. PATENT DOCUMENTS

| | | | | |
|---|---|---|---|---|
| 4,808,199 | A | * | 2/1989 | Yearout .............................. 95/49 |
| 5,362,522 | A | * | 11/1994 | Barri et al. .................... 427/435 |
| 2002/0053284 | A1 | * | 5/2002 | Koros et al. ....................... 95/51 |

FOREIGN PATENT DOCUMENTS

| | | |
|---|---|---|
| CN | 1837035 | 9/2006 |
| CN | 101306327 | 11/2008 |
| JP | 4-326930 | 11/1992 |
| WO | WO 2008/069030 | 1/2008 |
| WO | WO 2008/069030 | 6/2008 |

OTHER PUBLICATIONS

English translation PCT/CN2009/000757 International Preliminary Report (Jan. 2011).*
English translation CN 1837035 A.*
English translation Japanese Patent Application No. 4326930 A.*
English translation Japanese Patent Application No. 4326930 A (Nov. 1992).*
English translation CN 1837035 A (Sep. 2006).*
International Search Report for PCT/CN2009/000757, dated Oct. 15, 2009.
Hagg et al., *Carbon Molecular Sieve Membranes for Gas Separation*, Department of Chemical Engineering, Norwegian University of Science and Technology, Membrane Engineering for the Treatment of Gases, Chapter 15, vol. 2: Gas-Separation Problems Combined with Membrane Reactors, edited by Drioli et al., Royal Society of Chemistry, 2011.
Ismail et al. *A Review on the Latest Development of Carbon Membranes for Gas Separation*, Journal of Membrane Science, vol. 193, pp. 1-18, 2001.
Introduction for Bekipor Filter, 2006.
Scholz et al., *Design of Membrane Modules for Gas Separations*, RWTH Aachen University, Chemische Verfahrenstechnik (CVT), Aachen, Germany, Evokik Degussa GmbH, Process Technology & Engineering, Marl Germany, Membrane Engineering for the Treatment of Gases: Chapter 5, vol. 1: Gas-Separation Problems with Membranes, edited by Drioli et al., Royal Society of Chemistry, 2011.
Zhang et al., *Selective Defect-Patching of Zeolite Membranes Using Chemical Liquid Deposition at Organic/Aqueous Interfaces*, Advanced Functional Materials, vol. 18, pp. 2434-2443, 2008.

(Continued)

*Primary Examiner* — John Kim
(74) *Attorney, Agent, or Firm* — Nixon & Vanderhye, P.C.

(57) ABSTRACT

Disclosed is a spiral wound carbon membrane and preparation method thereof. The spiral wound carbon membrane is composed of one or more integral and windable membrane layers composed of a porous support and carbon materials containing fillers filled in the surface, pores and gaps thereof. The spiral wound carbon membrane has a developed ultramicropore porous structure with superior mechanical strength and toughness, and can be directly used to separate a gas mixture with different molecular sizes or liquid mixture.

4 Claims, No Drawings

(56) References Cited

OTHER PUBLICATIONS

Guo et al., *Hierarchical Growth of Large-Scale Ordered Zeolite Silicalite-1 Membranes with High Permeability and Selectivity for Recycling $CO_2$*, Angewandte Chemie, vol. 45, pp. 7053-7056, 2006.

Guo et al., *Hierarchical Growth of Large-Scale Ordered Zeolite Silicalite-1 Membranes with High Permeability and Selectivity for Recycling $CO_2$*, Supporting Information, Angewandte Chemie, 2006.

\* cited by examiner

SPIRAL WOUND CARBON MEMBRANE AND PREPARATION METHOD THEREOF

This application is the U.S. national phase of International Application No. PCT/CN2009/000757 filed 3 Jul. 2009 which designated the U.S. and claims priority to CN Patent Application No. 200810012222.X filed 8 Jul. 2008, the entire contents of each of which are hereby incorporated by reference.

TECHNICAL FIELD

The invention generally belongs to the field of membrane materials. It pertains to a membrane material and a preparation method thereof, and particularly pertains to a spiral wound carbon membrane material and a preparation method thereof.

BACKGROUND ART

The carbon membrane is a novel membrane material for gas separation. Comparing with polymeric membranes, the carbon membrane has a lot of advantages such as good heat stability, chemical stability and excellent gas permeability etc. A great development on the research of the carbon membrane has been made since a defect-free hollow fiber carbon membrane was prepared by the Israelite in 1983. A plenty of novel carbon membrane materials and their precursor materials, preparation methods thereof have been emerged. Suda and Haraya et al. prepared a homogeneous carbon membrane with the selectivity of $O_2/N_2$ up to 36 by the precursor of polyimide. Foley et al. manufactured the nano-porous composite carbon membranes on the porous stainless steel tube or plate using the precursor of poly(furfuryl alcohol) by the methods of ultrasonic deposition, spin coating, spray coating, respectively. Wang Huanting et al. fabricated composite carbon molecular sieve membrane on an alumina tube support via the in situ gas polymerization of furfuryl alcohol monomer. The carbon membranes such as homogeneous carbon membrane, however, are very fragile and brittle. Their mechanical strengths are very poor and have no any value for commercial application. And for the composite carbon membranes, although their mechanical strengths have been improved greatly, the manufacturing cost in current is very high due to complicated preparation process, expensive support such as ceramic, porous stainless steel tube or plate to be used. Besides, the membrane module fabricated by the flat or tubular composite carbon membrane has a less membrane area in unit volume owing to the low packing density. As a result, the gas permeability in unit carbon membrane module is very low and loses its competitive advantage in gas permeability with the polymeric hollow fiber membrane having a large membrane area. That is the reason why the carbon membrane has still not realized the industrial application in large scale until now

DISCLOSURE OF INVENTION

One object of the invention is to provide a novel spiral wounds carbon membrane and a preparation method thereof for solving the problems in the prior art, such as the low mechanical strength of the homogeneous carbon membrane, and the complicated preparing process, high manufacturing cost and low gas permeability for the flat or tubular composite carbon membrane, and for promoting the industrial application of the carbon membrane.

The embodiments of the spiral wound carbon membrane and the preparation method thereof of the present invention include:

(1) the spiral wound carbon membrane may be fabricated by an integral and windable membrane layer composed of a porous support and a carbon material containing fillers filled in the surface, pores and gaps of the porous support or composed of a thin carbon film, which has a plenty of porous structure with superior mechanical strength and toughness, and can be directly applied in the separation of a gas mixture with different molecular sizes or liquid mixture;

(2) the spiral wound carbon membrane may alternatively be composed of a windable base membrane and a separation layer, or composed of a windable base membrane, a transitional layer and a separation layer, which are closely combined together; the base membrane is composed of a porous support and a carbon material containing fillers filled in the surface, pores and gaps of the porous support, which has a plenty of porous structure with high mechanical strength and toughness and serves as a support for the transitional layer and/or the separation layer so as to supply diffusion tunnels for the gas or liquid molecules; the transitional layer is an intermediate layer composed of carbon materials containing fillers, which functions to provide a uniform pore structure having a smaller pore size for the separation layer so as to improve the formation of separation layer; the separation layer is a very thin film composed of pure carbon materials or carbon materials containing fillers, which has a ultramicroporous structure and serves like a sieve to separate a gas mixture with different molecular sizes or liquid mixture by allowing the small size molecules passing through and blocking the large size molecules;

(3) the support may be made of high strength weaving, nylon filter mesh, carbon cloth, carbon paper, carbon felt, polymer film, porous polymer mesh, stainless steel mesh, aluminum mesh, nickel mesh, alloy mesh, copper mesh or iron mesh;

(4) the carbon materials may be prepared by carbonizing a polymeric precursor at high temperature, wherein the polymeric precursor is one selected from polyamic acid, polyimide, polyetherimide, poly(phthalazinone ether sulfone ketone), poly(furfuryl alcohol), phenolic resin, poly(vinylidene chloride), poly(vinylidene fluoride), polyacrylonitrile, various celluloses, polysulfone, polyether sulfone and the like;

(5) the fillers may be consisted of one selected from the group consisting of inorganic nanoparticles, inorganic salts, metal particles, metal salts, biomass, organic additives and the like, or a combination thereof.

The inorganic nanoparticles as the filler may be one selected from the group consisting of zeolite molecular sieve, porous carbon, $SiO_2$, $TiO_2$, ZnO, NiO, $Fe_2O_3$, FeO and the like.

The zeolite molecular sieve may be ZSM-5, 1-type, Y-type, T-type, 4A, SBA-15, MCM-41 or MCM-48 molecular sieve. The porous carbon is CMK-3, ordered carbon, carbon nanotube, porous graphite, carbon molecular sieve or activated carbon.

As the filler, the metal particles may be Ag, Fe, Cu, Pt, Pd or Au, and the metal salt may be one selected from the group consisting of $AgNO_3$ and $CuNO_3$. The inorganic salt as the filler may be one selected from the group consisting of ammonium carbonate, ammonium bicarbonate and calcium carbonate.

The biomass as the filler may be wood flour, lignin, rice hull, fruit shell or straw.

The organic additive as the filler may be one selected from the group consisting of polyethylene glycol, polyvinylpyrrolidone, polyurethane, poly(vinyl butyral), ABS and polyvinyl alcohol.

The embodiments of the preparing method for the spiral wound carbon membrane are as follows:

a. one or more of the above mentioned fillers are added into one of the above mentioned polymers, and they are then uniformly mixed, dispersed or dissolved in a solvent to prepare a membrane-forming solution by co-blending, sol-gel or in situ synthesizing, wherein the amount of the fillers is usually controlled in a range from 10% to 50% by weight, and in order to ensure the easy distribution of the fillers in the polymer, the dispersion is preferably carried out by ultrasonic dispersion or high speed agitation, wherein the time for the ultrasonic dispersion is in a range from 1 h to 2 h and the time for the high speed agitation is in a range from 1 h to 5 h;

b. the membrane-forming solution is filled into the pores or gaps of the support to prepare a windable flat composite film by a method selected from the group consisting of knife coating, dipping coating, brushing coating and extruding, and then evaporated off the solvent, dried to obtain a precursor film of the spiral wound carbon membrane, wherein the temperature for the evaporating and drying is in a range from 80° C. to 120° C. and the time is in a range from 1 h to 3 h;

c. the obtained precursor film is carbonized by placing directly into a carbonizing oven, or by placing into a carbonizing oven after a pre-oxidation, or by placing directly into a carbonizing oven to sequentially carry out a pre-oxidation and a carbonization, wherein under the protection of an inert gas, the base membrane of the spiral wound carbon membrane is prepared by adjusting the carbonization process conditions, such as heating rate, final temperature of the carbonization, the inert gas and the like, and the carbonization is performed with a heating rate ranging from 0.2° C. to 10° C./min, a final temperature of the carbonization ranging from 500° C. to 1000° C., a constant temperature time or retention time ranging from 1 h to 5 h under the protection of argon or nitrogen;

d. the transitional layer may be prepared through the same steps a to c.

e. a casting solution is prepared by formulating one of the above mentioned polymers into a solution, or adding additionally one or more of the above mentioned fillers to prepare a mixture solution, wherein the fillers are usually contained in a weight amount of 10% to 30% (wt); a separation layer is prepared by coating uniformly the casting solution on the base membrane or the transitional layer of the spiral wound carbon membrane by dipping, spray coating, ultrasonically depositing or in situ depositing, and then evaporated off the solvent, dried, carbonized or carbonized after a pre-oxidation to afford the spiral wound composite carbon membrane, wherein the temperature for evaporating and drying is in a range from 80° C. to 120° C. and the time is in a range from 1 h to 3 h, and the carbonization is performed with a heating rate ranging from 0.2° C. to 5° C./min, a final carbonization temperature ranging from 500° C. to 800° C., and a constant temperature time or retention time ranging from 2 h to 5 h under the protection of argon or nitrogen.

The carbonization process is a batchwise or continuous process.

The Benefits and Advantages of The Invention (1) The spiral wound carbon membrane according to the present invention has a high mechanical strength and a high gas permeability, and overcomes the defects of inferior mechanical strength in the homogeneous carbon membrane and the low gas permeability of the composite carbon membrane in the prior art.

(2) The spiral wound carbon membrane module according to the present invention has a high membrane filing density per unit volume and a large membrane area, and overcomes the defects of low membrane filing density per unit volume and small membrane area of the flat or tube composite carbon membranes in the prior art.

(3) The method for preparing the spiral wound carbon membrane according to the present invention is simple and easily controlled, which can realize a continuous production with a low manufacturing cost, and thus overcomes the defects of complex process for the preparation of composite carbon membrane with high manufacturing cost in the prior art; it can also easily be scaled up to achieve an industrial production.

(4) The pore size of the carbon membrane can be effectively controlled by the method for preparing the spiral wound carbon membrane according to the present invention, and the carbon membranes having various pore sizes, high gas permeability and selectivity can be designed and prepared by the method for preparing the spiral wound carbon membrane according to the present invention according to the system to be separated.

BEST MODE FOR CARRYING OUT THE INVENTION

The invention is described in detail referring to the following examples.

Example 1

ZSM-5 and polyethylene glycol were added into poly(phthalazinone ether sulfone ketone) through a sol-gel method, and then ultrasonically dispersed for 1 h so as to distribute uniformly in poly(phthalazinone ether sulfone ketone) to obtain a membrane-forming solution containing ZSM-5 in a solid content of 25 wt % and polyethylene glycol in a content of 15 wt %. The membrane-forming solution was filled into the pores and gaps of a pre-treated stainless steel mesh with a pore size of 400 mesh by brush coating to prepare a windable flat composite membrane, which was then dried at 80° C. for 3 h to provide precursor membrane of a spiral wound carbon membrane. The precursor membrane was carbonized in a batchwise carbonizing oven to obtain a base membrane for the spiral wound carbon membrane. The carbonization was performed with a final carbonization temperature of 800° C., a heating rate of 2° C./min and a constant temperature time of 2 h under the protection of argon. The obtained base membrane for the spiral wound carbon membrane has an average pore size of 0.23 μm, a porosity of 36.34%, a nitrogen permeability of $35.34 \text{ m}^3 \cdot \text{m}^{-2} \cdot \text{s}^{-1} \cdot \text{Pa}^{-1} \times 10^{-8}$.

Example 2

$SiO_2$ was added in polyamic acid by co-blending, and then ultrasonically dispersed for 0.5 h to distribute uniformly to obtain a membrane-forming solution containing $SiO_2$ in a solid content of 20 wt %. The membrane-forming solution was filled in pores and/or gaps of a pre-treated support selected from the group consisting of high strength weaving, nylon filter screen, carbon cloth, porous polymer mesh, stainless steel mesh, copper mesh and iron mesh by knife coating to prepare a windable flat composite film, which was then dried at 100° C. for 2 h to prepare precursor membrane of a spiral wound carbon membrane. The precursor membrane was carbonized in a batchwise carbonizing oven so as to prepare a base membrane for the spiral wound carbon membrane. The carbonization was performed with a final carbonization temperature of 600° C., a heating rate of 5° C./min, a constant temperature time of 2 h under the protection of nitrogen. The pore structure and gas permeability of obtained base membrane for the spiral wound carbon membranes were showed in table 1.

TABLE 1 the pore structure and gas permeability of the obtained base membranes for the spiral wound carbon membrane prepared from different supports

| The support for the base membrane | average pore size D/μm | porosity q/% | nitrogen permeability $F/(m^3 \cdot m^{-2} \cdot S^{-1} \cdot Pa^{-1} \times 10^{-8})$ |
|---|---|---|---|
| high strength weaving | 0.15 | 29.11 | 22.43 |
| nylon filter screen | 0.20 | 31.86 | 27.14 |
| carbon cloth | 0.13 | 30.20 | 21.65 |
| porous polymer mesh | 0.35 | 33.36 | 36.82 |
| stainless steel mesh | 0.27 | 34.32 | 34.32 |
| copper mesh | 0.30 | 36.59 | 38.65 |
| iron mesh | 0.25 | 36.88 | 36.03 |

Example 3

Fe and polyurethane were respectively added in each one selected from the group consisting of poly(phthalazinone ether sulfone ketone), polyimide, polyetherimide, poly(furfuryl alcohol), phenol formaldehyde resin, poly(vinylidene chloride), poly(vinylidene fluoride), polyacrylonitrile, methylcellulose and polyether sulphone by co-blending, and then stirred at high speed for 3 h to distribute uniformly to obtain a membrane-forming solution containing Fe in a solid content of 15 wt % and polyurethane in a content of 10 wt %. The obtained membrane-forming solution was filled in pores and gaps of a pre-treated stainless steel mesh with a pore size of 300 mesh by extrusion to prepare a windable flat composite film, which was then dried at 120° C. for 1 h to prepare a precursor membrane of a spiral wound carbon membrane. The precursor membrane was carbonized in a continuous carbonizing oven so as to prepare a base membrane for the spiral wound carbon membrane. The carbonization was performed with a final carbonization temperature of 700° C. and a retention time of 2 h under the protection of nitrogen. The pore structure and gas permeability of obtained base membrane for the spiral wound carbon membranes were showed in table 2.

TABLE 2 the pore structure and gas permeability of the obtained base membranes for the spiral wound carbon membranes prepared from different polymers

| The precursor for the base membrane | average pore size (D/μm) | porosity q/% | nitrogen permeability $F/(m^3 \cdot M^{-2} \cdot S^{-1} \cdot Pa^{-1} \times 10^{-8})$ |
|---|---|---|---|
| poly(phthalazinone ether sulfone ketone) | 0.26 | 36.91 | 34.73 |
| Poly(furfuryl alcohol) | 0.23 | 33.72 | 31.06 |
| phenol formaldehyde resin | 0.15 | 30.20 | 27.55 |
| poly(vinylidene chloride) | 0.10 | 32.66 | 29.85 |
| poly(vinylidene fluoride) | 0.18 | 35.19 | 36.46 |
| polyacrylonitrile | 0.12 | 33.48 | 30.03 |
| polyimide | 0.20 | 35.55 | 33.26 |
| polyetherimide | 0.22 | 40.12 | 39.87 |
| methyl cellulose | 0.32 | 41.12 | 40.87 |
| polyether sulphone | 0.29 | 44.49 | 43.03 |

Example 4

ZSM-5, polyethylene glycol or their mixture were added respectively into poly(phthalazinone ether sulfone ketone) through co-blending, and then ultrasonically dispersed for 1 h so as to distribute uniformly in poly(phthalazinone ether sulfone ketone) to prepare a membrane-forming solution containing ZSM-5 with a solid content of 25 wt %, or polyethylene glycol with a content of 15 wt %, or ZSM-5 with a content of 10 wt % and polyethylene glycol with a content of 5 wt % in the case of a mixture of ZSM-5 and polyethylene glycol. The membrane-forming solution was filled in pores and gaps of pre-treated stainless steel mesh with a pore size of 400 mesh by extrusion to prepare a windable flat composite film, which was dried at 80° C. for 3 h to provide a precursor membrane of a spiral wound carbon membrane. The precursor membrane was carbonized in a batchwise carbonizing oven so as to obtain a spiral wound carbon membrane. The carbonization was performed with a final carbonization temperature of 800° C., a heating rate of 2° C./min and a constant temperature time of 2 h under the protection of argon. The obtained spiral wound carbon membranes showed gas separation properties listed in table 3.

TABLE 3 the gas separation properties of the spiral wound carbon membranes (testing temperature: 30° C.)

| filler | Permeability (GPU · $10^{-2}$) | | | | | Selectivity | | |
|---|---|---|---|---|---|---|---|---|
| | $H_2$ | $CO_2$ | $O_2$ | $N_2$ | $CH_4$ | $CO_2/N_2$ | $O_2/N_2$ | $CO_2/CH_4$ |
| ZSM-5 | 56.42 | 49.65 | 10.33 | 1.13 | 0.38 | 43.94 | 9.14 | 130.66 |
| polyethylene glycol | 75.71 | 51.43 | 11.58 | 1.26 | 0.42 | 40.82 | 9.19 | 122.45 |
| mixture | 74.21 | 59.49 | 13.95 | 1.28 | 0.39 | 46.48 | 10.9 | 152.54 |

(1 GPU = $10^{-6}$ cm$^3$ (STP)/(cm$^2$ s cmHg))

Example 5

β-type, Y-type, T-type, MCM-48, CMK-3, carbon nano tube, carbon molecular sieve, NiO, Fe$_2$O$_3$, Ag, Pt, CuNO$_3$, calcium carbonate, wood flour, lignin, straw, ZrO$_2$, poly(vinyl butyral) and polyvinyl alcohol as a filler were respectively added in phenolic resin by co-blending, and then ultrasonically dispersed for 0.5 h so as to distribute uniformly to prepare membrane-forming solutions containing a filler in a solid content of 20 wt %. The obtained membrane-forming solution was filled into pores and gaps of a pre-treated stainless steel mesh with a pore size of 350 mesh by extrusion to prepare a windable flat composite membrane, which was dried at 100° C. for 2 h to provide a precursor membrane of a spiral wound carbon membrane. The precursor membrane was carbonized in a batchwise carbonizing oven to obtain a base membrane for the spiral wound carbon membrane. The carbonization was performed with a final carbonization temperature of 700° C., a heating rate of 1° C./min and a constant temperature time of 1 h under the protection of argon. The pore structure and gas permeability of obtained base membrane for the spiral wound carbon membranes were showed in table 4.

TABLE 4 the pore structure and gas permeability of obtained base membrane for the spiral wound carbon membranes prepared by adding various fillers

| The filler for the base membrane | average pore size (D/μm) | porosity q/% | nitrogen permeability F/(m$^3$ · M$^{-2}$ · S$^{-1}$ · Pa$^{-1}$ × 10$^{-8}$) |
|---|---|---|---|
| Carbon molecular sieve | 0.25 | 37.93 | 36.89 |
| β type molecular sieve | 0.27 | 35.34 | 35.26 |
| Y type molecular sieve | 0.26 | 36.25 | 37.84 |
| T type molecular sieve | 0.33 | 36.84 | 37.99 |
| MCM-48 | 0.40 | 44.02 | 43.34 |
| carbon nano tube | 0.41 | 42.31 | 41.58 |
| CMK-3 | 0.40 | 39.98 | 39.06 |
| NiO | 0.29 | 36.86 | 38.16 |
| Fe$_2$O$_3$ | 0.32 | 37.33 | 37.95 |
| Pt | 0.18 | 38.59 | 30.47 |
| Ag | 0.20 | 36.26 | 38.88 |
| CuNO$_3$ | 0.22 | 35.77 | 37.15 |
| calcium carbonate | 0.36 | 38.11 | 40.16 |
| lignin | 0.31 | 32.58 | 30.62 |
| poly(vinyl butyral) | 0.28 | 35.93 | 32.77 |
| wood flour | 0.35 | 34.93 | 34.89 |
| straw | 0.32 | 36.33 | 38.65 |
| polyvinyl alcohol | 0.27 | 35.53 | 30.76 |

Example 6

TiO$_2$ and polyvinylpyrrolidone were mixed with poly(furfuryl alcohol) by a in situ synthesis, then the mixture was uniformly dispersed in poly(furfuryl alcohol) for 5 h under high speed stirring to prepare a membrane-forming solution containing TiO$_2$ in a solid content of 20 wt % and polyvinylpyrrolidone in a content of 15 wt %. The membrane-forming solution was filled in pores and gaps of a pre-treated stainless steel mesh with a pore size of 350 mesh by extrusion to prepare a windable composite film, which was dried at 80° C. for 3 h to provide a precursor membrane for a spiral wound carbon membrane. The precursor membrane was carbonized in a batchwise carbonizing oven so as to obtain a base membrane for the spiral wound carbon membrane. The carbonization was performed with a final carbonization temperature of 700° C., a heating rate of 2° C./min and a constant temperature time of 2 h under the protection of argon. The obtained base membrane for the spiral wound carbon membrane showed pore structure properties with an average pore size of 0.20 μm, a porosity of 34.34% and a nitrogen permeability of 31.34 m$^3$·m$^{-2}$·s$^{-1}$·Pa$^{-1}$×10$^{-8}$.

Example 7

ZSM-5 and polyethylene glycol were added into poly(phthalazinone ether sulfone ketone) through a sol-gel method, and then ultrasonically dispersed for 1 h so as to distribute uniformly in poly(phthalazinone ether sulfone ketone) to form a membrane-forming solution containing ZSM-5 in a solid content of 25 wt % and polyethylene glycol in a content of 15 wt %. The obtained membrane-forming solution was filled in pores and gaps of a pre-treated stainless steel mesh with a pore size of 450 mesh by extrusion to prepare a windable composite film, which was dried at 100° C. for 2 h to prepare a precursor membrane. The precursor membrane was carbonized in a batchwise carbonizing oven so as to directly obtain a spiral wound carbon membrane. The carbonization was performed with a final carbonization temperature of 700° C., a heating rate of 2° C./min and a constant temperature time of 3 h under the protection of nitrogen. The obtained spiral wound carbon membrane showed pore structure properties of an average pore diameter of 50 nm, a porosity of 34.34% and a pure water flux of 0.4 m$^3$·m$^{-2}$·h$^{-1}$·bar$^{-1}$. The retention of the spiral wound carbon membrane is 99.5% for separating waste water containing oil, 99.7% for separating waste water containing titanium pigment, and 97.6% for separating waste water containing dyes.

Example 8

Polyimide, polyetherimide, poly(phthalazinone ether sulfone ketone), poly(furfuryl alcohol), phenol formaldehyde resin, poly (vinylidene chloride), poly (vinylidene fluoride), polyacrylonitrile, methylcellulose, polysulfone and polyether sulphone were formulated respectively into solutions with a concentration of 15 wt % as the membrane-coating solutions. The obtained membrane-coating solutions were sprayed respectively on the base membrane of the spiral wound carbon membrane prepared in example 3 to form a separation layer with a thickness of 15 μm. After dried at 100° C. for 1 h, the obtained membrane was carbonized in a batchwise carbonizing oven so as to obtain a spiral wound carbon membrane with separation layer. The carbonization was performed with a final carbonization temperature of 700° C. and a constant temperature time of 3 h under the protection of argon. The obtained spiral wound carbon membranes with separation layer showed gas separation properties listed in table 5.

TABLE 5 the gas separation properties of the spiral wound carbon membranes with separation layer produced by using different polymer precursors (testing temperature: 30° C.)

| The precursor for the separation layer | Permeability (GPU · 10$^{-2}$) | | | | | | | Selectivity | | | |
|---|---|---|---|---|---|---|---|---|---|---|---|
| | $H_2$ | $CO_2$ | $O_2$ | $N_2$ | $CH_4$ | $C_2H_4$ | $C_3H_6$ | $CO_2/N_2$ | $O_2/N_2$ | $CO_2/CH_4$ | $C_2H_4/C_3H_6$ |
| polyimide | 15.8 | 5.59 | 1.03 | 0.1 | 0.055 | 0.081 | 0.0082 | 55.9 | 10.3 | 101.6 | 9.88 |
| poly(phthalazinone ether sulfone ketone) | 18.8 | 4.6 | 0.89 | 0.081 | 0.041 | 0.052 | 0.0046 | 56.79 | 10.99 | 112.2 | 11.30 |
| poly(furfuryl alcohol) | 16.5 | 4.72 | 1.02 | 0.082 | 0.031 | 0.064 | 0.0048 | 57.56 | 12.44 | 152.3 | 13.33 |
| phenol formaldehyde resin | 17.7 | 4.91 | 0.99 | 0.11 | 0.035 | 0.091 | 0.0072 | 44.63 | 9 | 140.3 | 12.64 |
| poly (vinylidene chloride) | 16.3 | 5.41 | 1.05 | 0.123 | 0.034 | 0.064 | 0.0053 | 43.98 | 8.537 | 159.1 | 12.08 |
| poly (vinylidene fluoride) | 14.9 | 6.27 | 1.15 | 0.12 | 0.035 | 0.11 | 0.0095 | 52.25 | 9.583 | 179.1 | 11.58 |
| polyacrylonitrile | 17.1 | 4.28 | 1.04 | 0.084 | 0.032 | 0.13 | 0.0091 | 50.95 | 12.38 | 133.8 | 14.29 |
| polyetherimide | 17.2 | 4.89 | 0.81 | 0.113 | 0.035 | 0.085 | 0.0066 | 43.27 | 7.168 | 139.7 | 12.88 |
| Methyl cellulose | 16.7 | 5.38 | 1.06 | 0.14 | 0.041 | 0.072 | 0.0041 | 38.42 | 7.571 | 131.2 | 17.56 |
| polysulfone | 14.6 | 6.31 | 1.23 | 0.15 | 0.054 | 0.11 | 0.011 | 42.07 | 8.2 | 116.9 | 10.00 |
| polyether sulphone | 17.5 | 4.47 | 1.08 | 0.07 | 0.035 | 0.12 | 0.0087 | 63.86 | 15.43 | 127.7 | 13.79 |

(1 GPU = 10$^{-6}$ cm$^3$ (STP)/(cm$^2$ s cmHg))

Example 9

ZXM-5, β-type, CMK-3, carbon nanotube, carbon molecular sieve, Ni, Fe2O3, Ag, Pt, calcium carbonate, polyvinylpyrrolidone and polyethylene glycol were respectively added in polyamic acid by co-blending, and ultrasonically dispersed for 1 h to distribute uniformly to form a solution containing a filler in a solid content of 15 wt % with a concentration of 15 wt % as a membrane-coating solution. The obtained membrane-coating solutions were sprayed on the base membranes of the spiral wound carbon membrane prepared in example 3 respectively to prepare a separating layer with a thickness of 15 μm. After dried at 100° C. for 1 h, the obtained membrane was carbonized in a continuous carbonizing oven so as to obtain a spiral wound carbon membrane with separation layer. The carbonization was performed with a final carbonization temperature of 700° C. and a constant temperature time of 3 h under the protection of nitrogen. The obtained spiral wound carbon membranes with separation layer showed gas separation properties listed in table 6.

TABLE 6 the gas separation properties of the spiral wound carbon membranes with separation layer produced with different fillers (testing temperature: 30° C.)

| Fillers | Permeability (GPU · 10$^{-2}$) | | | | | Selectivity | | |
|---|---|---|---|---|---|---|---|---|
| | $H_2$ | $CO_2$ | $O_2$ | $N_2$ | $CH_4$ | $CO_2/N_2$ | $O_2/N_2$ | $CO_2/CH_4$ |
| Carbon molecular sieve | 75.8 | 45.35 | 13.01 | 1.36 | 0.44 | 33.35 | 9.566 | 103.07 |
| Ni | 78.8 | 45.31 | 8.747 | 0.89 | 0.4 | 50.91 | 9.828 | 113.28 |
| $Fe_2O_3$ | 56.5 | 49.02 | 10.64 | 0.93 | 0.33 | 52.71 | 11.44 | 148.55 |
| Ag | 57.7 | 45.69 | 9.213 | 0.9 | 0.33 | 50.77 | 10.24 | 138.45 |
| Pt | 56.3 | 24.88 | 4.83 | 0.59 | 0.15 | 42.17 | 8.186 | 165.87 |
| β-type | 54.9 | 29.27 | 5.37 | 0.66 | 0.16 | 44.35 | 8.136 | 182.94 |
| ZSM-5 | 57.1 | 31.82 | 7.61 | 0.69 | 0.24 | | 11.03 | 132.58 |
| calcium carbonate | 67.7 | 40.54 | 8.17 | 0.73 | 0.29 | 55.53 | 11.19 | 139.79 |
| CMK-3 | 66.3 | 34.35 | 6.67 | 0.76 | 0.21 | 45.21 | 8.776 | 163.57 |
| Polyethylene glycol | 57.1 | 42.43 | 10.15 | 0.79 | 0.32 | 53.71 | 12.85 | 132.59 |
| Carbon nano tube | 76.3 | 44.35 | 11.67 | 0.96 | 0.35 | 46.19 | 12.2 | 126.7 |
| polyvinylpyrrolidone | 68.1 | 49.43 | 15.15 | 1.01 | 0.30 | 48.9 | 15.0 | 144.8 |

(1 GPU = 10$^{-6}$ cm$^3$ (STP)/(cm$^2$ s cmHg))

Example 10

A membrane-forming solution was prepared by dissolving polyamic acid into a solution with a concentration of 15 wt %. The obtained membrane-forming solution was coated on a base membrane of the spiral wound carbon membrane prepared in example 3 to form a separation layer with a thickness of 15 μm by dipping, ultrasonically depositing and in situ depositing respectively. After dried at 100° C. for 1 h, the obtained membrane was carbonized in a continuous carbonizing oven so as to obtain a spiral wound carbon membrane with separation layer. The carbonization was performed with a final carbonization temperature of 700° C. and a constant temperature time of 3 h under the protection of argon. The obtained spiral wound carbon membranes showed gas separation properties listed in table 7.

TABLE 7 the gas separation properties of the spiral wound carbon membranes with separation layer produced by different coating methods (testing temperature: 30° C.)

| Coating methods for the separation layer | Permeability (GPU · $10^{-2}$) | | | | | Selectivity | | |
|---|---|---|---|---|---|---|---|---|
| | $H_2$ | $CO_2$ | $O_2$ | $N_2$ | $CH_4$ | $CO_2/N_2$ | $O_2/N_2$ | $CO_2/CH_4$ |
| Dipping | 18.42 | 5.73 | 1.14 | 0.15 | 0.04 | 38.2 | 7.6 | 128.11 |
| Ultrasonically depositing | 15.68 | 5.63 | 1.21 | 0.13 | 0.041 | 43.31 | 9.31 | 140.56 |
| in situ depositing | 14.87 | 5.54 | 0.98 | 0.08 | 0.038 | 69.25 | 12.3 | 142.83 |

(1 GPU = $10^{-6}$ cm$^3$ (STP)/(cm$^2$ s cmHg))

Example 11

A membrane-forming solution was prepared by dissolving polyamic acid into a solution with a concentration of 15 wt %. The obtained membrane-forming solution was coated by spraying on a base membrane of the spiral wound carbon membrane prepared in example 3 to form a separation layer with a thickness of 15 μm. After dried at 100° C. for 1 h, the obtained membrane was carbonized at different temperatures in a batchwise carbonizing oven so as to obtain spiral wound carbon membranes. The carbonization was performed with a constant temperature time of 1 h under the protection of nitrogen. The obtained spiral wound carbon membranes showed gas separation properties listed in table 8.

TABLE 8

The gas separation properties of the spiral wound carbon membranes produced at different carbonation temperatures (testing temperature: 30° C.)

| Carbonization Temperature (° C.) | Permeability (GPU · $10^{-2}$) | | | | | Selectivity | | |
|---|---|---|---|---|---|---|---|---|
| | $H_2$ | $CO_2$ | $O_2$ | $N_2$ | $CH_4$ | $CO_2/N_2$ | $O_2/N_2$ | $CO_2/CH_4$ |
| 500 | 213.1 | 162.2 | 14.03 | 2.13 | 3.21 | 76.06 | 6.59 | 50.467 |
| 600 | 78.1 | 40.5 | 4.93 | 0.61 | 0.53 | 66.39 | 8.08 | 76.415 |
| 700 | 16.5 | 5.9 | 1.2 | 0.13 | 0.053 | 45.38 | 9.23 | 111.32 |
| 800 | 75.4 | 38.1 | 4.68 | 0.55 | 0.43 | 69.27 | 8.51 | 88.605 |

(1 GPU = $10^{-6}$ cm$^3$ (STP)/(cm$^2$ s cmHg))

Example 12

One to three transitional layers were prepared by the method shown in example 3 on a base membrane of the spiral wound carbon membrane produced by the preparation method in example 3. A membrane-coating solution was prepared by dissolving polyamic acid into a solution with a concentration of 15 wt %. The obtained membrane-forming solution was coated by spraying on the transitional layer respectively to form a separation layer with a thickness of 15 mm. After dried at 100° C. for 1 h, the obtained membrane was carbonized at different temperatures in a batchwise carbonizing oven so as to obtain a spiral wound carbon membrane with transitional layer and separation layer. The carbonization was performed with a constant temperature time of 1 h under the protection of argon. The obtained spiral wound carbon membranes showed gas separation properties listed in table 9.

TABLE 9 the gas separation properties of the spiral wound carbon membranes with different number of transitional layers (testing temperature: 30° C.)

| The number of Transitional layer | Permeability (GPU · $10^{-2}$) | | | | | Selectivity | | |
|---|---|---|---|---|---|---|---|---|
| | $H_2$ | $CO_2$ | $O_2$ | $N_2$ | $CH_4$ | $CO_2/N_2$ | $O_2/N_2$ | $CO_2/CH_4$ |
| 1 | 16.42 | 5.89 | 1.08 | 0.13 | 0.051 | 45.31 | 8.31 | 115.49 |
| 2 | 15.71 | 5.65 | 1.04 | 0.07 | 0.042 | 80.71 | 14.86 | 134.52 |
| 3 | 14.21 | 5.03 | 0.98 | 0.05 | 0.035 | 100.61 | 19.62 | 143.71 |

(1 GPU = $10^{-6}$ cm$^3$ (STP)/(cm$^2$ s cmHg))

INDUSTRIAL APPLICABILITY

The spiral wound carbon membrane according to the present invention is made of an integral and windable wound membrane layer, which is composed of a porous support and carbon materials containing fillers filled in the surface, pores and gaps of the porous support or composed of a thin carbon film, and has a plenty of porous structure, and very high mechanical strength and toughness, and can be directly used to separate a gas mixture with different molecular sizes or liquid mixture.

The support is made of high strength weaving, nylon filter mesh, carbon cloth, carbon paper, carbon felt, polymer film, porous polymer mesh, stainless steel mesh, aluminum mesh, nickel mesh, alloy mesh, copper mesh or iron mesh.

The carbon material is prepared by carbonizing a polymeric precursor at a high temperature. The filler is consisted of one selected from the group consisting of inorganic nanoparticles, inorganic salts, metal particles, metal salts, biomass, organic additives and the like, or a combination thereof.

The spiral wound carbon membrane according to the present invention can be prepared by a method including:

a. one or more of the selected fillers mentioned above are added into one kind of the above mentioned polymers, and then uniformly mixed, dispersed or dissolved in a solvent to prepare the membrane-forming solution by co-blending, sol-gel or in situ synthesizing, wherein the amount of the fillers is usually controlled in a range from 10% to 50% by weight, the dispersion is carried out by ultrasonic dispersion or high speed agitation, wherein the time for the ultrasonic distribution is in a range from 1 h to 2 h and the time for the high speed agitation is in a range from 1 h to 5 h;

b. the membrane-forming solution is filled into the pores or gaps of the support to prepare a windable composite film by a method selected from knife coating, dipping coating, brushing coating and extruding, and then evaporated off the solvent, dried to obtain a precursor film of the spiral wound carbon membrane, wherein the temperature for the evaporating and drying is in a range from 80° C. to 120° C. and the time is in a range from 1 h to 3 h;

c. the obtained precursor film is carbonized by placing directly into a carbonizing oven, or by placing into a carbonizing oven after a pre-oxidation, or by placing directly into a carbonizing oven to sequentially carry out a pre-oxidation and a carbonization to prepare a base membrane of the spiral wound carbon membrane, wherein the carbonization is performed with a heating rate ranging from 0.2° C. to 10° C./min, a final carbonization temperature ranging from 500° C. to 1000° C., and a constant temperature time or retention time ranging from 1 h to 5 h under the protection of argon or nitrogen;

d. a transitional layer may be prepared through the same steps a to c;

e. a casting solution is prepared by formulating one of the above mentioned polymers into a solution, or adding additionally one or more of the above mentioned fillers to prepare a mixture solution, wherein the fillers are usually contained in a weight amount of 10% to 30%; a separation layer is prepared by coating uniformly the casting solution on the base membrane or the transitional layer of the spiral wound carbon membrane by dipping, spray coating, ultrasonically depositing or in situ depositing, and then evaporated off the solvent, dried, carbonized or carbonized after a pre-oxidation to afford the spiral wound composite carbon membrane, wherein the temperature for evaporating and drying is in a range from 80° C. to 120° C. and the time is in a range from 1 h to 3 h, and the carbonization is performed with a heating rate ranging from 0.2° C. to 5° C./min, a final carbonization temperature ranging from 500° C. to 800° C., and a constant temperature time or retention time ranging from 2 h to 5 h under the protection of argon or nitrogen.

The spiral wound carbon membrane and preparation method thereof according to the present invention can be realized in the industrial scale, which overcome the problems in the prior art of inferior mechanical strength in the homogeneous carbon membrane, and of complex preparing process, high manufacturing cost and low gas permeability in the flat or tubular composite carbon membranes, and thus can promote the industrial application of the carbon membrane.

The invention claimed is:

1. A spiral wound carbon membrane, which is a carbon-based membrane material consisting of one or more integral and windable membrane layers, wherein the carbon membrane is composed of an integral and windable membrane layer, which is composed of a porous support and carbon materials containing fillers filled in the surface, pores and gaps of the porous support, has a porous structure with mechanical strength and toughness, and can be directly used to separate a gas mixture with different molecular sizes or liquid mixture;

the support is made of stainless steel mesh, aluminum mesh, nickel mesh, alloy mesh, copper mesh or iron mesh;

the carbon material is prepared by carbonizing a polymeric precursor at a high temperature; the filler is consisted of one selected from the group consisting of inorganic nanoparticles, inorganic salts, metal grains, and metal salts, or a combination thereof;

wherein the precursor polymer is one selected from the group consisting of polyamic acid, polyimides, polyetherimides, poly(phthalazinone ether sulfone ketones), poly(furfuryl alcohols), phenolic resins, poly(vinylidene chloride), poly(vinylidene fluoride), polyacrylonitrile, celluloses, polysulfone and polyether sulfone;

wherein the inorganic nanoparticles as the fillers are one selected from the group consisting of zeolite molecular sieve, $SiO_2$, $TiO_2$, ZnO, NiO, $Fe_2O_3$ and FeO;

the metal grains as the fillers are Ag, Fe, Cu, Pt, Pd or Au;

the metal salt is $AgNO_3$ or $CuNO_3$; and the inorganic salts as the fillers are one selected from the group consisting of ammonium carbonate, ammonium bicarbonate and calcium carbonate;

the inorganic salts, metal grains and metal salts as fillers are nanoparticles or microparticles.

2. The spiral wound carbon membrane according to claim 1, wherein the spiral wound carbon membrane is composed of a windable base membrane and a separation layer, or composed of a windable base membrane, a transitional layer and a separation layer, which are closely combined together; the base membrane is composed of a porous support and carbon materials containing the fillers in the surface, pores and gaps of the support; the transitional layer is an intermediate layer composed of carbon materials containing the fillers; the separation layer is a thin film composed of pure carbon materials or carbon materials containing the fillers;

wherein, in the case of that the spiral wound carbon membrane is composed of a windable base membrane and a separation layer, the separation layer is formed on the windable base membrane, or in the case of that the spiral wound carbon membrane is composed of a windable base membrane, a transitional layer and a separation layer, the separation layer is formed on the transitional layer that is formed directly on the windable base membrane.

3. The spiral wound carbon membrane according to claim 1, wherein the zeolite molecular sieve is ZSM-5, β-type, Y-type, T-type, 4A, SBA-15, MCM-41 or MCM-48; the porous carbon is CMK-3, carbon nanotube, ordered carbon, porous graphite, carbon molecular sieve or activated carbon.

4. The spiral wound carbon membrane according to claim 1, wherein the spiral wound carbon membrane is used to separate a mixture of various gases or liquids.

* * * * *